(12) United States Patent
Borkgren et al.

(10) Patent No.: US 8,468,655 B2
(45) Date of Patent: Jun. 25, 2013

(54) HINGE ASSEMBLY FOR FRAME HAVING TWO PIVOT AXES

(75) Inventors: Stanely R. Borkgren, Geneseo, IL (US); William D. Graham, East Moline, IL (US); Xinzhan Z. Yang, Bettendorf, IA (US)

(73) Assignee: Deere & Company, Moline, IL (US)

( * ) Notice: Subject to any disclaimer, the term of this patent is extended or adjusted under 35 U.S.C. 154(b) by 545 days.

(21) Appl. No.: 12/765,118

(22) Filed: Apr. 22, 2010

(65) Prior Publication Data

US 2011/0258811 A1    Oct. 27, 2011

(51) Int. Cl.
*E05D 11/10*    (2006.01)

(52) U.S. Cl.
USPC ............... 16/348; 16/368; 16/370; 16/371; 16/357; 172/311; 172/456

(58) Field of Classification Search
USPC ................ 16/366, 368, 369, 370, 371, 348, 16/357, 360, 361, 286, 287, 288; 172/311, 172/456

See application file for complete search history.

(56) References Cited

U.S. PATENT DOCUMENTS

| 4,328,869 | A  * | 5/1982  | Perelli ........................... 172/311 |
| 4,862,758 | A  * | 9/1989  | Magee .......................... 172/311 |
| 4,878,545 | A  * | 11/1989 | Dyken .......................... 172/311 |
| 6,213,219 | B1 * | 4/2001  | Mosdal et al. ................. 172/311 |
| 7,497,269 | B2 * | 3/2009  | Jagow ........................... 172/311 |
| 7,886,407 | B2 * | 2/2011  | Resnik et al. .................... 16/286 |
| 7,984,767 | B2 * | 7/2011  | Friggstad et al. ............. 172/311 |
| 8,122,970 | B2 * | 2/2012  | Palen .......................... 172/311 |
| 2007/0169950 | A1 * | 7/2007 | Grieshop ....................... 172/311 |
| 2008/0189906 | A1 * | 8/2008 | Resnik et al. ..................... 16/54 |
| 2011/0131762 | A1 * | 6/2011 | Palen ............................... 16/366 |

\* cited by examiner

*Primary Examiner* — Jeffrey O Brien

(57) ABSTRACT

A hinge assembly with two pivot axes is provided for a folding frame. One pivot axis, a working pivot axis, allows the outer wing frame to rotate while in operation to follow the ground contours by rotating relative to the adjacent frame section without creating any interference between adjacent tools mounted to the frame sections. The second pivot axis is a folding pivot axis above the frame and about which the outer wing frame rotates to fold the outer wing into the transport position. This hinge assembly when used on a five section implement frame allows the outer wing frame to both follow the ground contour and to fold into an acceptable transport position.

5 Claims, 8 Drawing Sheets

HINGE ASSEMBLY FOR FRAME HAVING TWO PIVOT AXES

FIELD

This relates to a hinge assembly defining two pivot axes and in particular to a hinge assembly used in a frame of an agricultural implement to fold an outer wing frame relative to an adjacent frame section and also to provide for floating the outer wing frame relative to the adjacent frame section when in the working position to follow the ground contours.

BACKGROUND

Agricultural producers, like other producers, are constantly seeking to increase productivity. One way to increase productivity is to increase the size of the land used for production. However, while area of land may increase, the length of the season for planting a crop is generally fixed in the duration. Thus, to increase the acreage in production, the producer must either buy additional equipment and hire operators for that equipment or purchase equipment with greater productivity. One way to increase machine productivity is to increase the width of the machine.

In the case of an air seeder drill such as the John Deere 1890 air drill, the difficulty of increasing the width is attaching an outer wing of a five section frame to enable folding of the outer wing for transport and to allow the outer wing frame float when in the planting position. A pivot axis of the hinge must be such that the row openers of the outer wing do not contact adjacent row openers when the outer wing floats during planting operations.

SUMMARY

A hinge assembly with two pivot axes is provided. One pivot axis, a working axis, allows the outer wing to follow the ground contours without creating any interference between adjacent row openers. The second pivot axis, a folding axis, is above the frame and is used to fold the outer wing into the transport position. This allows the five section planter to both follow the ground contour and to fold into an acceptable transport position.

DETAILED DESCRIPTION

Figure 1:
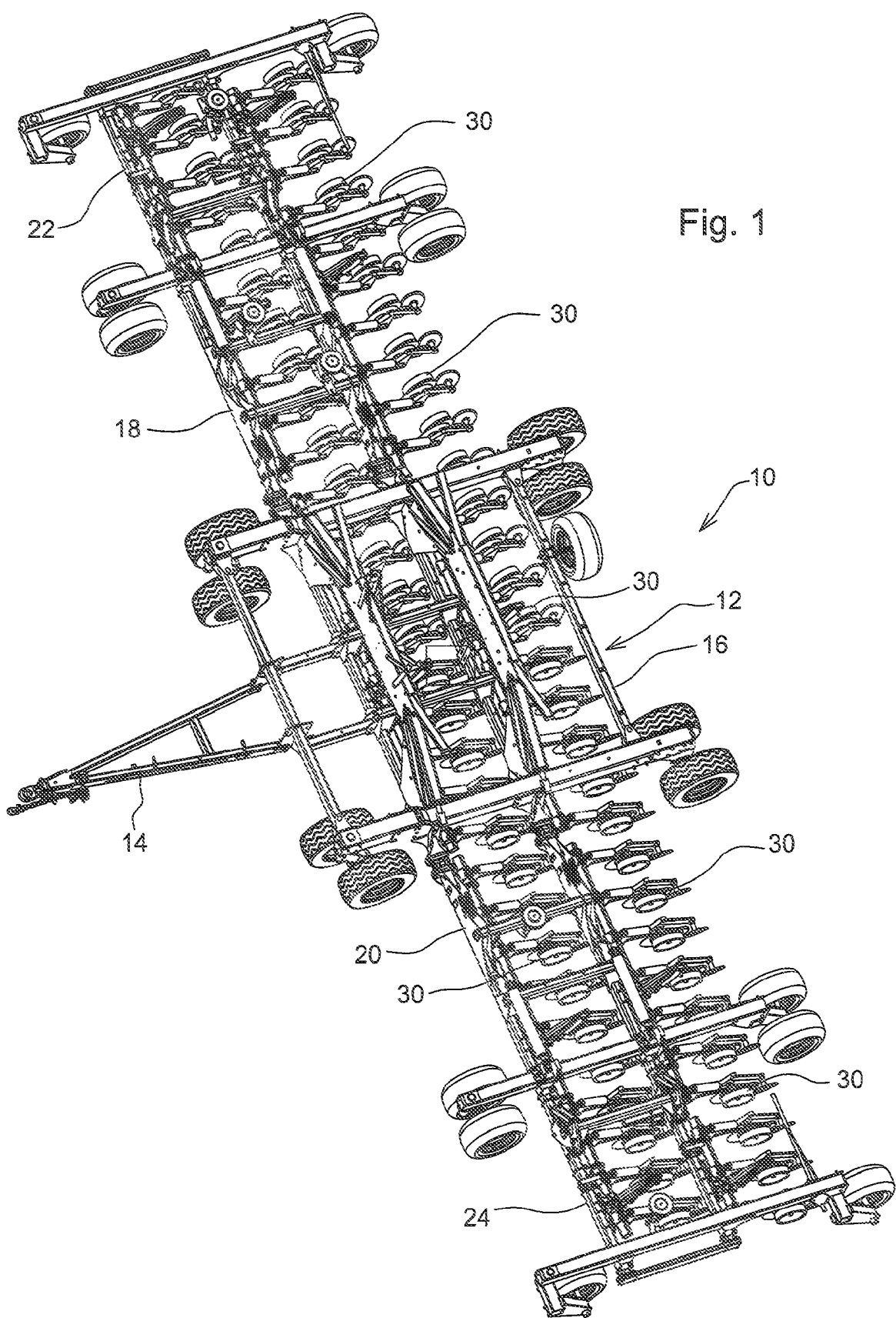
FIG. 1 is a perspective view of an air-drill frame having the hinge assembly as described.

With reference to FIG. 1, an air-drill 10 is shown having a hinge assembly connecting an outer wing frame to an inner wing frame. Air-drill 10 has a frame 12 including a tongue 14 used to couple the air-drill to a tractor or other prime mover. The frame 12 consists of five sections, a center frame 16, inner wing frames 18, 20 and outer wing frames 22, 24. Each inner wing frame is coupled to the center frame 16 by hinge mechanisms to enable the inner frames to pivot from the working position shown in FIG. 1 to a raised transport position, not shown. Likewise, the outer wing frames 22, 24 are coupled to the inner wing frames by hinge assemblies to enable the outer wing frames to pivot or fold relative to the inner wing frames from the working position shown in FIG. 1 to a transport position shown in FIG. 10. Each of the five frame sections carry a number of ground engaging tools, in this case, furrow openers 30 to open a furrow into which seed is deposited and the furrow then closed. The furrow openers extend downwardly from the frame to engage the ground when in the working position. Other types of ground engaging tools can be used with the frame such as tillage tools or fertilizer applicators. The hinge assembly is not limited by the type of ground engaging tool.

Figure 2:
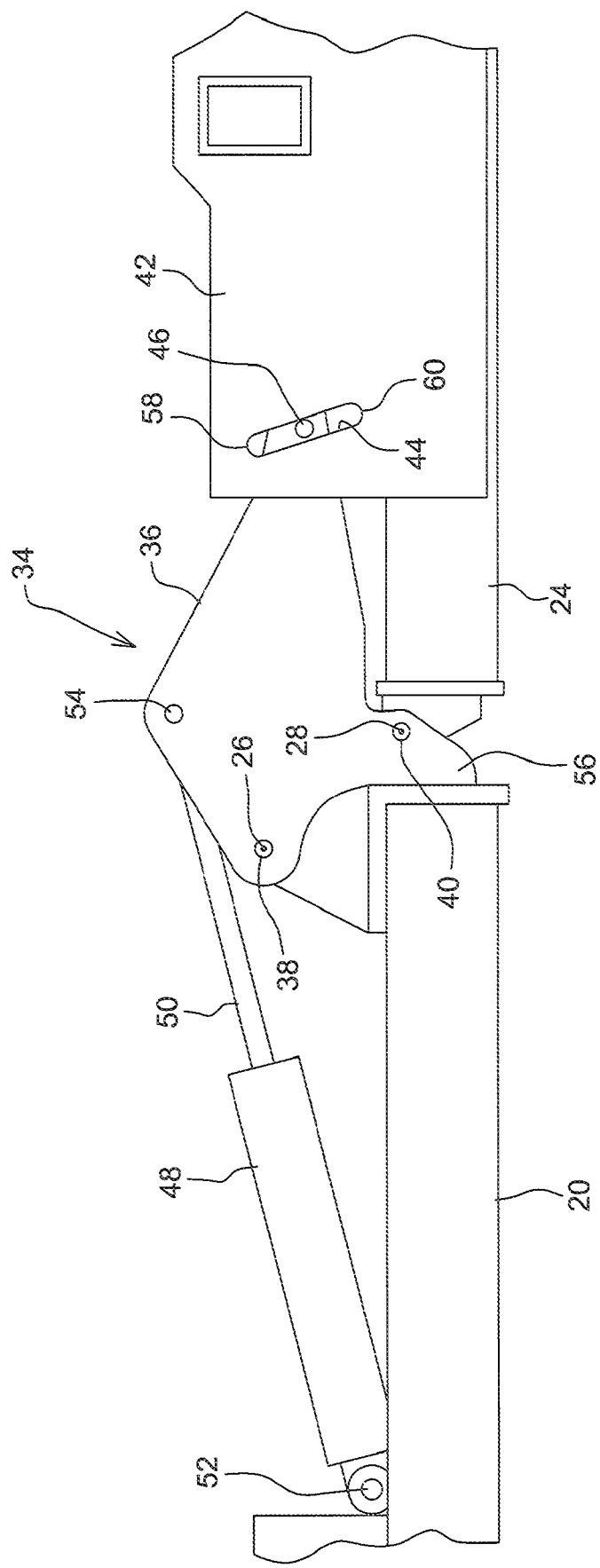
FIG. 2 is a front view of one hinge assembly showing the outer wing frame in a working position.
Figure 3:
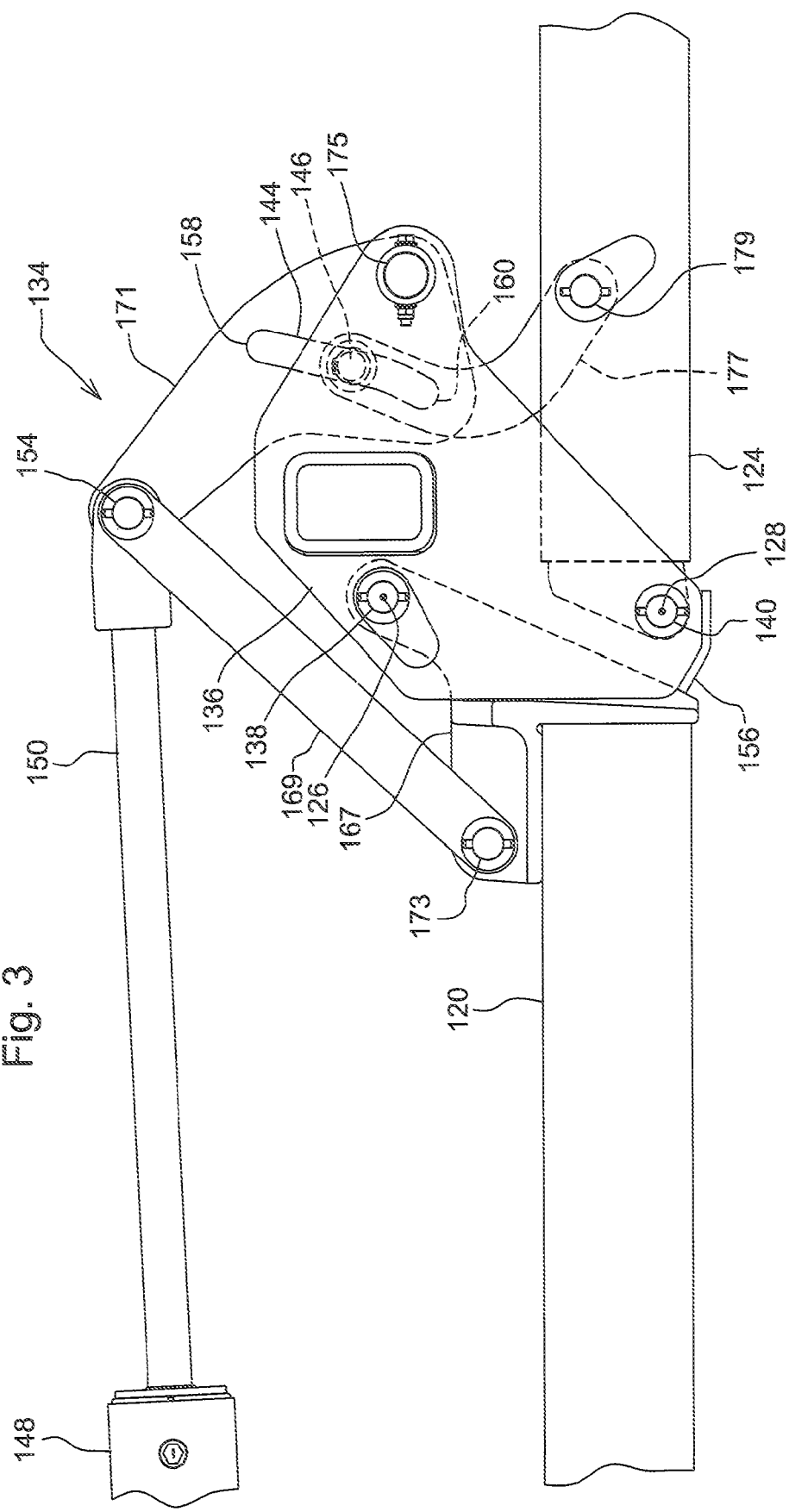
FIG. 3 is a front view of a another hinge assembly showing the outer wing frame in the working position

The hinge assembly, having two pivot axes, is used to connect the outer wing frame to the inner wing frame. However, the hinge assembly could also be used to attach the inner wing frames to the center frame. With reference to FIG. 2, one hinge assembly is shown. The hinge assembly 34 couples the outer wing frame 24 to the inner wing frame 20. The hinge assembly 34 includes a pivot plate 36 that is pivotally coupled to the frame 20 by a first pin 38 defining a folding pivot axis 26, normal to the plane of the paper of FIG. 2. The outer wing frame 24 is in turn pivotally coupled to the pivot plate 36 by a second pin 40 defining a working pivot axis 28, also normal to the plane of the paper. The outer wing frame 24 includes a weldment 42 having a slot 44. A float stop pin 46 is mounted to the pivot plate 36 and travels in the slot 44. During operation, in the working position, the outer wing frame 24 is allowed to pivot about the second pin 40 to move up and down to follow the ground contour. The slot 44 defines of the amount of travel permitted by the outer wing frame during operation. The second pin 40 thus forms a working pivot axis about which the outer wing frame 24 is allowed to pivot relative to the inner wing frame 20 when in the working position.

An actuator 48, shown as a hydraulic cylinder, has an extendable and retractable rod 50. The cylinder is coupled to the inner wing frame 20 by a pivot pin 52 while the rod 50 is coupled to the pivot plate 36 by a third pin 54. In the working position shown in FIG. 2, hydraulic pressure is maintained in the actuator 48, holding a lower stop portion 56 of the pivot plate against the end of the inner wing frame 20. This holds the pivot plate in a fixed position relative to the frame 20. This prevents rotation of the pivot plate 36 about the first pin 38 when in the working position. To fold the frame, the rod 50 is retracted, causing the pivot plate 36 to rotate counterclockwise, as viewed in FIG. 2, about the first pin 38. Upon initial retraction of the rod 50, the float stop pin 46 will travel through the slot 44 until it engages the slot upper end 58. During this travel, the outer wing frame 24 will rotate clockwise about the working pivot axis. Once the float stop pin 46 engages the slot upper end 58 and the rod 50 continues to retract, the pivot plate 36 and outer wing frame 24 will rotate together, counterclockwise, about a folding pivot axis defined by the first pin 38 until the transport position is reached. The hinge assembly 34 provides both a working pivot axis and a folding pivot axis. However, the hinge assembly 34, when the outer wing frame 24 reaches a vertical position while being folded into the transport position, will allow the outer wing frame 24 to free fall as the frame 24 passes over center and the float stop pin 46 travels from the end 58 of the slot 44 to the slot end 60. This free fall of the outer wing frame 24 is prevented in the hinge assembly shown in FIGS. 3-10.

In FIGS. 3-10, elements of the hinge assembly 134 that are similar to elements in the hinge assembly 34 of FIG. 2 are given the same reference numeral with the addition of 100. The hinge assembly 134 includes a pivot plate 136 coupled to a riser 167 rigidly attached to the inner wing frame 120. The pivot plate 136 is coupled to the riser by a first pin 138 defining the folding pivot axis 126. The outer wing frame 124 is coupled to the pivot plate 136 by a second pivot pin 140 forming the working pivot axis 128. See FIG. 5 for the folding and working pivot axes 126, 128. The rod 150 of the actuator 148, instead of being coupled to the pivot plate 136 is coupled to first and second links 169 and 171 by a third pin 154. The opposite end of the first link 169 is pivotally coupled to the inner wing frame 120 by a fourth pin 173. The opposite end of the second link 171 is coupled to the pivot plate 136 by a fifth pin 175. The first and second links 169, 171 provide a higher location for the third pin 154 as compared to the hinge assembly 34 of FIG. 2, providing increased leverage to the actuator 148 as it moves the outer wing from the working position shown in FIG. 3 to the folded transport position.

A control link 177 is coupled to the outer wing frame 124 by a sixth pin 179. The opposite end of the control link contains a seventh pin, the float stop pin 146. The float stop pin 146 is contained within a slot 144 in the second link 171. During operation of the air-drill, the outer wing frame 124 is allowed to float up and down with the ground contour as the float stop pin 146 moves within the slot 144. As is described and shown in the following figures, the control link 177 and slot 144 are configured to prevent the outer wing frame 124 from free falling as it passes over center when being folded from the working position to the transport position.

Figure 4:
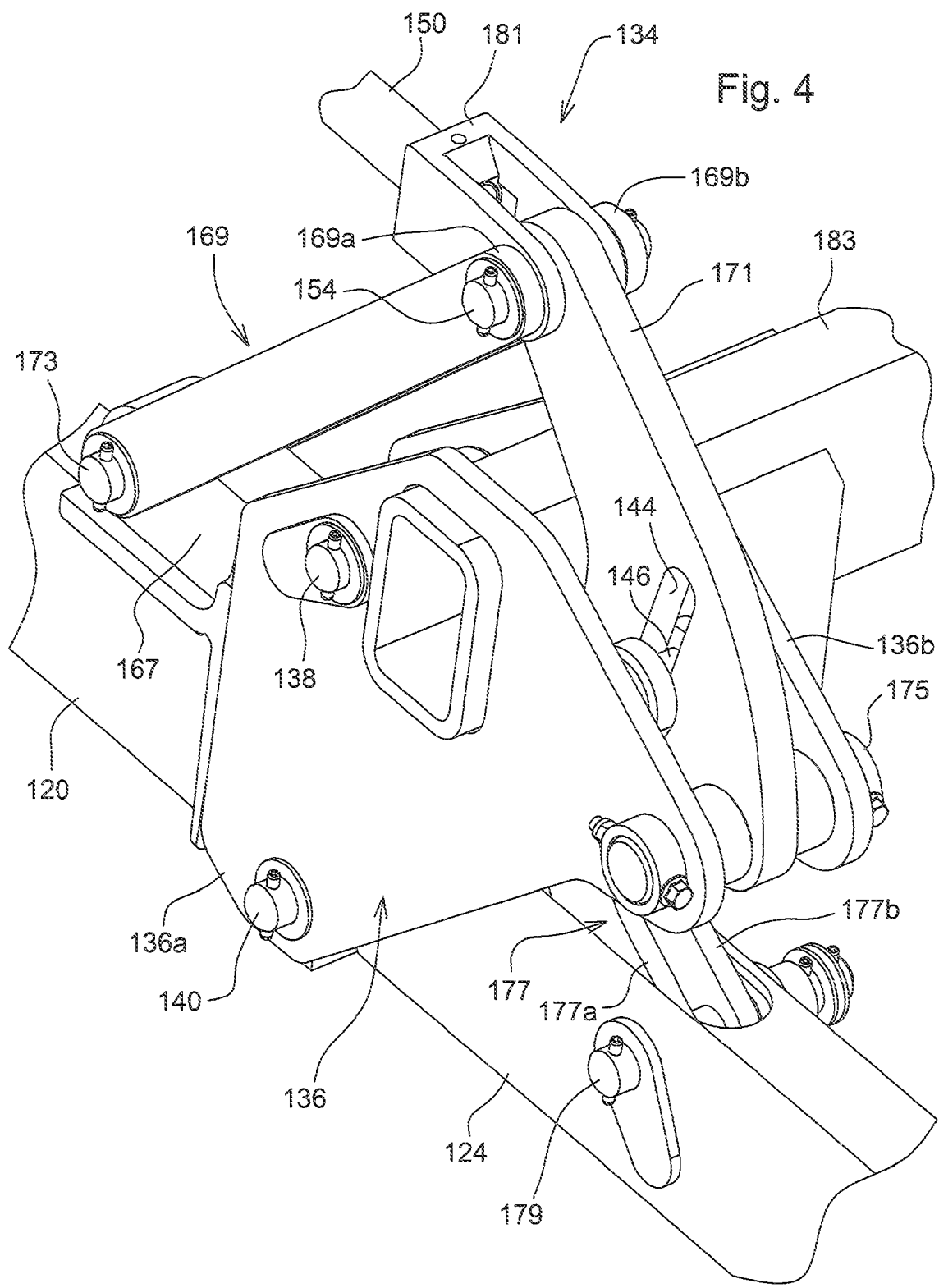
FIG. 4 is a perspective view of the hinge assembly shown in FIG. 3.
Figure 5:
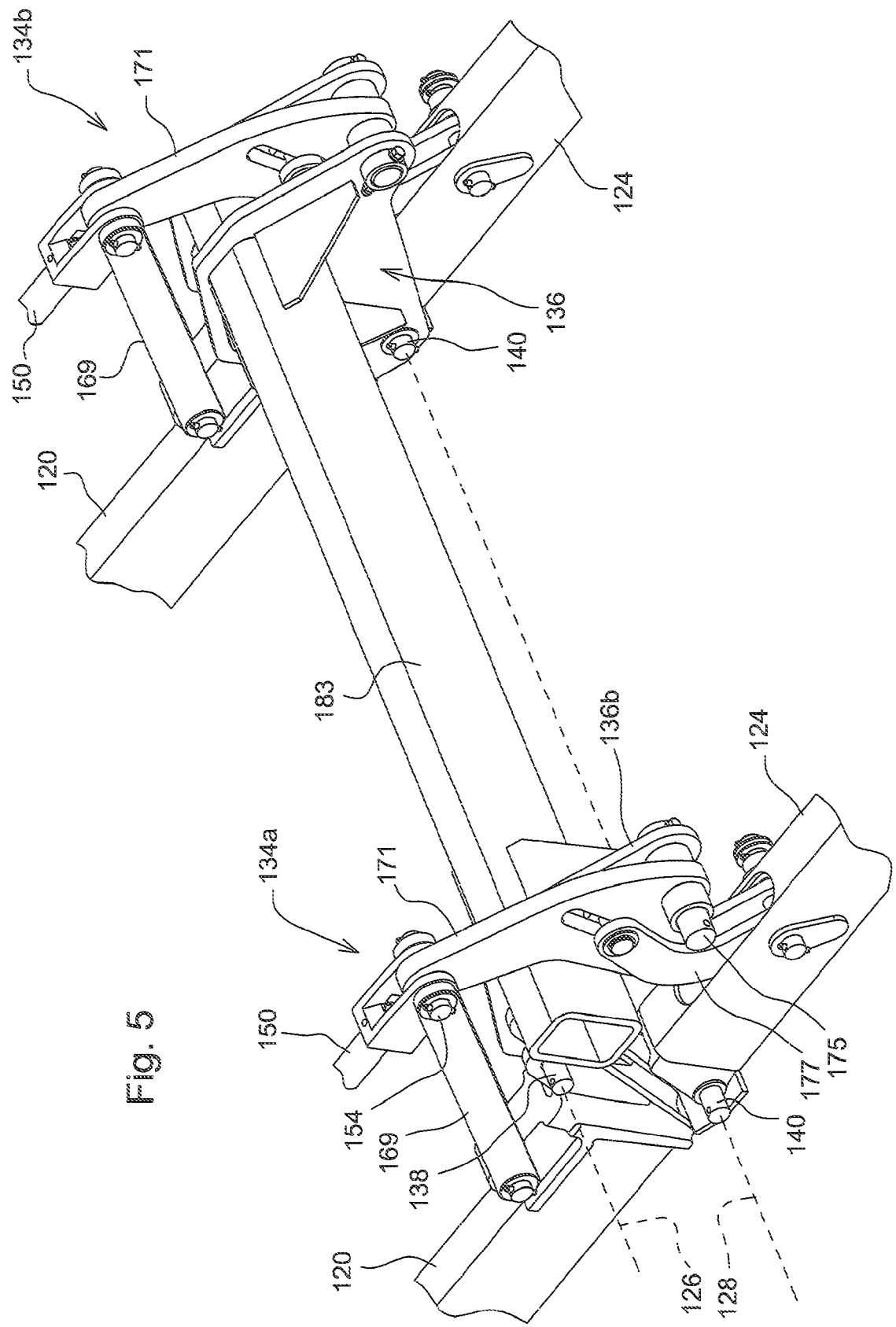
FIG. 5 is a perspective view of a portion of the air-drill frame showing the coupled front and rear hinge assemblies.

With reference to FIG. 4, the hinge assembly 134 is shown in perspective. This enables understanding of how the various components fit with one another. The front tube of the inner wing frame 120 and the front tube of the outer wing frame 124 are generally aligned with one another. The second link 171 is formed of a single plate. The first link 169, however, is formed of a pair of bars 169a and 169b on opposite sides of the plate forming link 171 and on the outside of the two legs of the clevis 181 at the end of the rod 150. The control link 177 is likewise formed of a pair of bars 177a and 177b on opposite sides of the second link 171. The pivot plate 136 is formed of two plate members 136a and 136b each on the opposite sides of the outer wing frame 124 and are welded to a cross tube 183. With reference to FIG. 5, a perspective view of the air-drill frame is shown with the front hinge assembly 134a and a rear hinge assembly 134b connected by the cross tube 183. The plate member 136a of the pivot plate 136 of the front hinge assembly 134a has been omitted to better visualize the structure of the hinge assembly.

Figure 6:
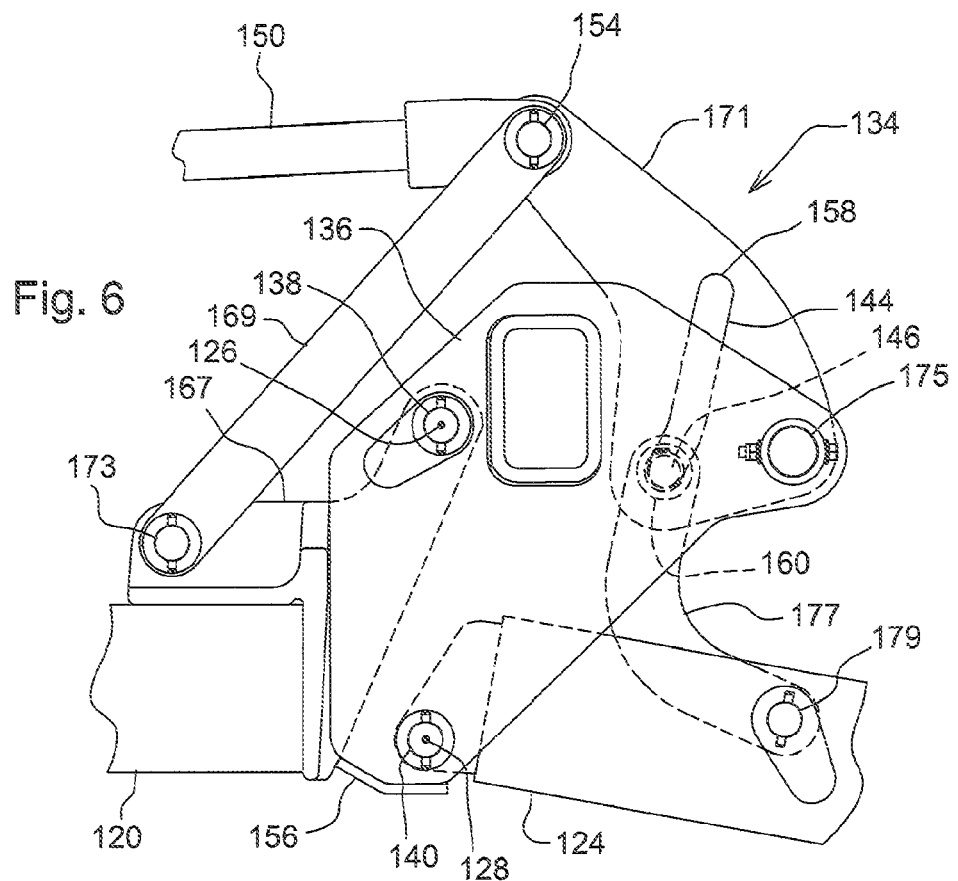
FIG. 6 is a front view of the hinge assembly of FIG. 3 with the outer wing frame in a downward maximum float position.
Figure 7:
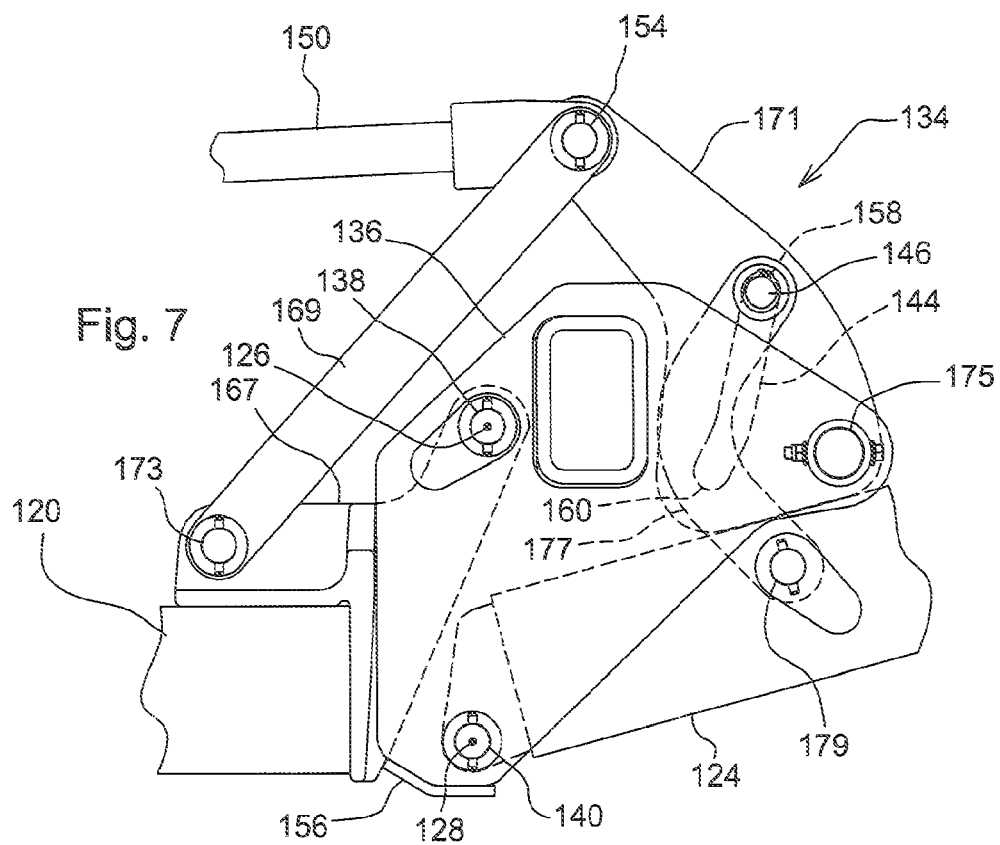
FIG. 7 is a front view of the hinge assembly of FIG. 3 with the outer wing frame in an upward maximum float position.

With reference to FIG. 6, the hinge assembly 134 is shown with the outer wing frame 124 in the working position with the outer wing frame floated downward to a lower limit. In this position, the float stop pin 146 is at the bottom end 160 of the slot 144, preventing further downward movement of the outer wing frame 124. In FIG. 7, the outer wing frame 124 is again shown in the working position. This time however the outer wing frame 124 has floated upward to the upper limit. The float stop pin 146 is at the upper end 158 of the slot 144. Since the control link 177 is pivotally connected to the outer wing frame 124, the slot 144 can have any shape desired with the two ends defining the limits of travel for the outer wing frame while floating in the working position. However, as described below with reference to FIG. 9, the shape of the slot 144 is important to provide further benefits to the hinge assembly 134.

Figure 8:
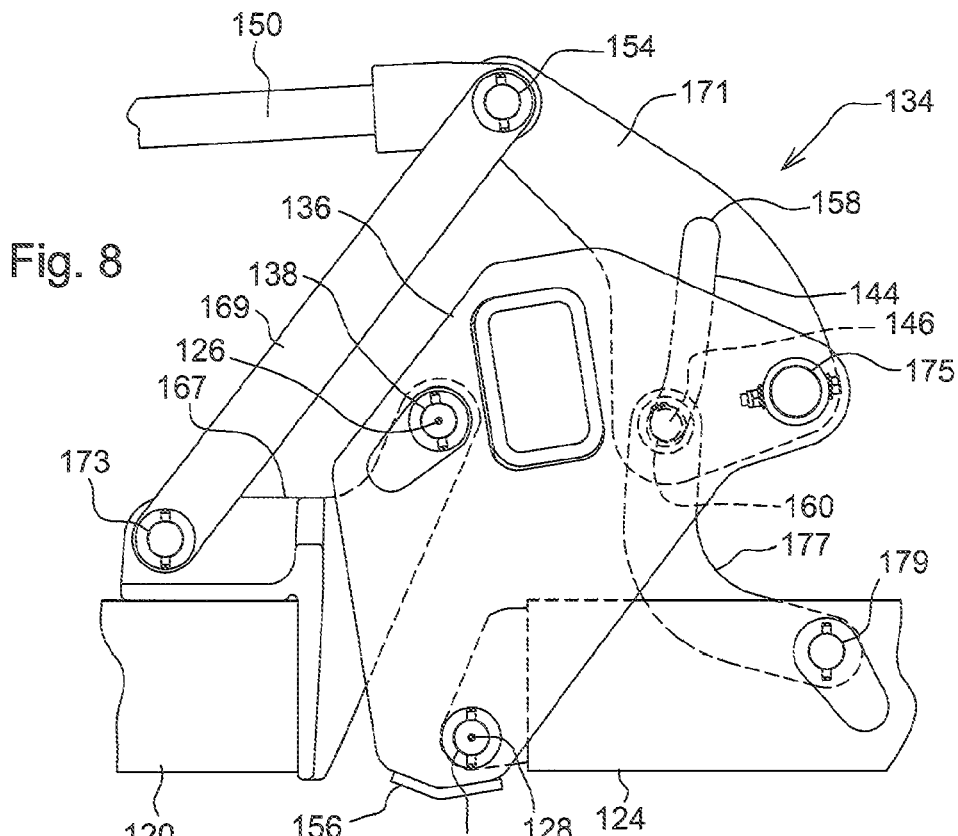
FIG. 8 is a front view of the hinge assembly of FIG. 3 at the initial stage of the folding the outer wing frame from the working position to a folded, transport position.

In FIG. 8, the other wing frame 124 is shown during the initial stage of folding to the transport position. Upon initial retraction of the rod 150, the pivot plate 136 begins rotating about the pin 138. The first and second links 169, 171 also begin to move. This causes the slot 144 to raise, causing the float stop pin 146 to move to the bottom end 160 of the slot 144. Once the float stop pin reaches the end of the slot, continued retraction of the rod 150 causes of the other wing frame 124 to pivot along with the pivot plate 136 about the pin 138 and folding pivot axis 126 toward the transport position.

Figure 9:
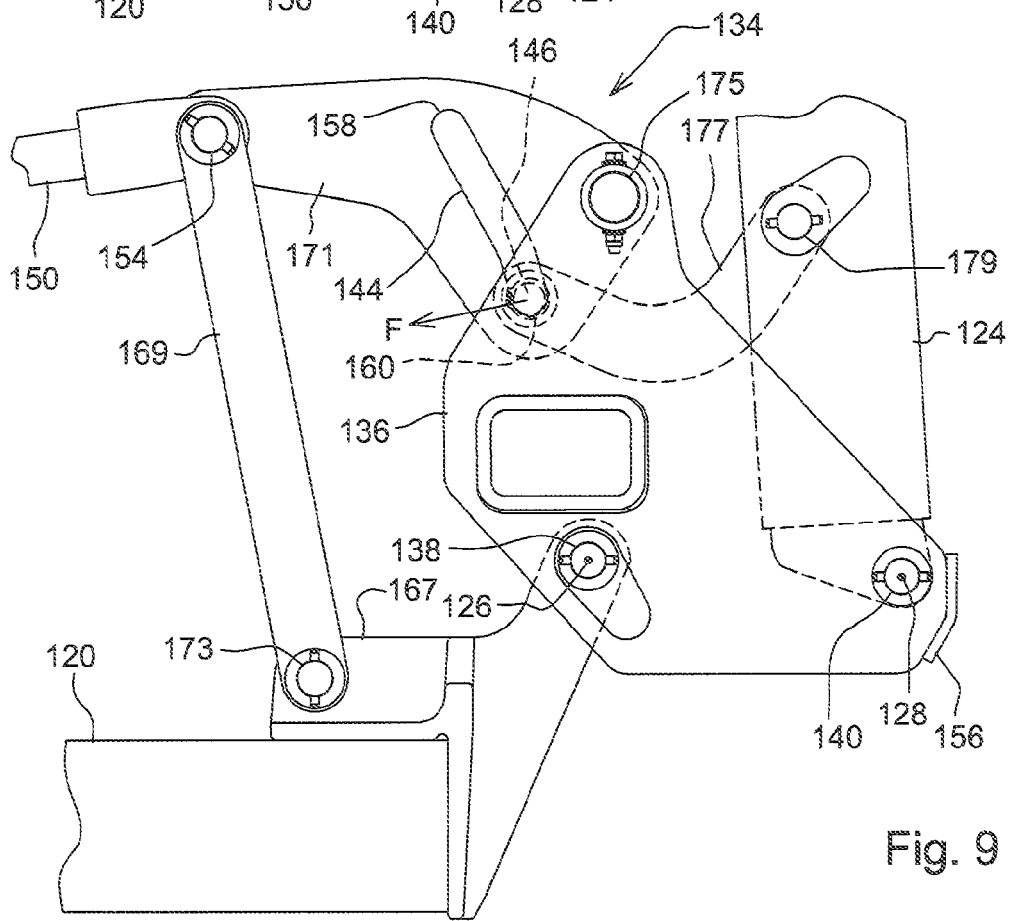
FIG. 9 is a front view of the hinge assembly of FIG. 3 with the outer wing frame in a substantially vertical intermediate position while being folded to the transport position.

In FIG. 9, the outer wing frame 124 has been rotated to a position just past a vertical position where the weight of the outer wing frame 124 would cause it to rotate counterclockwise about the pin 140. The outer wing frame 124 is stabilized by the control link 177. The float stop pin 146 bears against the edge of the slot 144 applying a force in the direction of the arrow F. This force is perpendicular to the side of the slot 144 with a plus and minus angular range determined by the friction coefficient between the pin 146 and slot 144 such that the pin does not slide in the slot but rather remains at the slot end 160, thereby holding the outer wing frame 124 in position and not allowing free fall of the outer wing frame.

Figure 10:
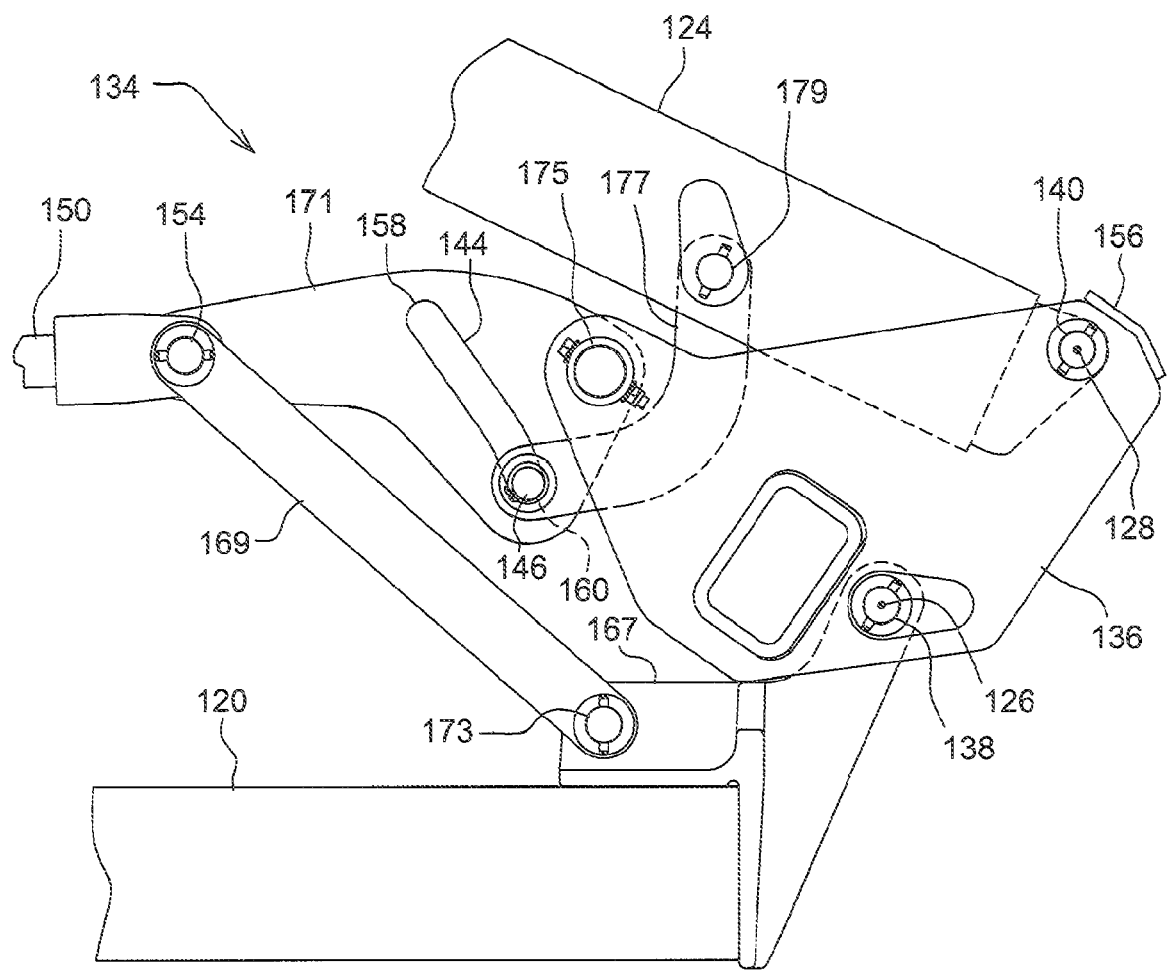
FIG. 10 is a front view of the hinge assembly of FIG. 3 with the outer wing frame in the transport position.

In FIG. 10, the outer wing frame 124 is shown in the folded transport position. At all times during folding of the outer wing into the transport position, the float stop pin 146 remains at the bottom end 160 of the of the slot 144, preventing uncontrolled rotation of the outer wing frame. The hinge assembly provides for two pivot axes, one axis being a working pivot axis 128 that allows the outer wing frame 124 to float relative to the inner wing frame 120, and the other axis being a folding pivot axis 126 generally located vertically higher than the working pivot axis about which the outer wing frame rotates from the working position to the transport position. The hinge assembly 134 allows the outer wing frame 124 to float downward about 10° from the horizontal in the working position and to float upward about 15° from the horizontal. When folded to the transport position, the wing rotates about 155° from the horizontal working position. To unfold the frame, the rod 150 is extended, causing the pivot plate 136 and the outer wing frame 124 to rotate about the folding pivot axis 126. At all times while unfolding, the float stop pin 146 remains at the lower end 160 of the slot 144 and the force acting between the float stop pin 146 and the slot edge is generally normal to the slot length.

It will become apparent that various modifications can be made without departing from the scope of the accompanying claims.

What is claimed is:

1. A hinge assembly for pivotally connecting a first frame section to a second frame section comprising:
   means forming a working pivot axis about which the second frame section is allowed to pivot when in a working position relative to the first frame section;
   means forming a folding pivot axis about which the second frame section pivots when the second frame section is being folded and unfolded between the working position and a transport position;

a pivot plate coupled to the first frame section by a first pin forming the working pivot axis and wherein the second frame section is coupled to the pivot plate by a second pin forming the folding pivot axis;

first and second links coupled to one another by a third pin, the first link also coupled to the first frame section by a fourth pin and the second link coupled to the second frame section by a fifth pin;

an actuator having an extendable and retractable member, the actuator coupled between the first frame section and the first and second links by the third pin for rotating the pivot plate about the first pin to move the second frame section between the working position and the transport position; and a control link coupled to the second frame section by a sixth pin and coupled to the second link by a seventh pin, the seventh pin moving within a slot in the second link as the second frame section rotates about the working pivot axis.

2. The hinge assembly of claim 1 wherein the slot defines the limits of rotation of the second frame section in the working position.

3. The hinge assembly of claim 1 wherein the slot is arranged in the second link such that, when the second frame section is rotated from the working position to the transport position and the second frame section reaches a vertical position, a force of the second frame section transferred through the control link to the second link is normal to a length of the slot with a +/− angular range determined by a friction coefficient between the seventh pin and the slot whereby the seventh pin does not move through the slot.

4. The hinge assembly of claim 1 wherein the working pivot axis is vertically lower than the folding pivot axis when in the working position.

5. The hinge assembly of claim 1 wherein the second frame section is allowed to rotate approximately 25 degrees about the working pivot axis when in the working position.

* * * * *